United States Patent
Sivashankar et al.

(10) Patent No.: US 10,665,104 B2
(45) Date of Patent: May 26, 2020

(54) DETECTING AN ANIMAL PROXIMATE A VEHICLE

(71) Applicant: Ford Global Technologies, LLC, Dearborn, MI (US)

(72) Inventors: Nithika Sivashankar, Canton, MI (US); Scott Vincent Myers, Camarillo, CA (US); Brielle Reiff, Mountain View, CA (US); Madeline Jane Schrier, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/763,416

(22) PCT Filed: Oct. 28, 2015

(86) PCT No.: PCT/US2015/057806
§ 371 (c)(1),
(2) Date: Mar. 26, 2018

(87) PCT Pub. No.: WO2017/074350
PCT Pub. Date: May 4, 2017

(65) Prior Publication Data
US 2018/0286243 A1    Oct. 4, 2018

(51) Int. Cl.
| | |
|---|---|
| *G08G 1/16* | (2006.01) |
| *A01K 11/00* | (2006.01) |
| *G08B 5/38* | (2006.01) |
| *G08B 3/10* | (2006.01) |
| *B60W 50/14* | (2020.01) |
| *G06K 19/077* | (2006.01) |

(52) U.S. Cl.
CPC .......... *G08G 1/162* (2013.01); *A01K 11/006* (2013.01); *B60W 50/14* (2013.01);
(Continued)

(58) Field of Classification Search
CPC .......... G08G 1/162; G08G 3/10; G08G 1/163; G08G 1/166; A01K 11/006; B60W 50/14;
(Continued)

(56) References Cited

U.S. PATENT DOCUMENTS

| | | |
|---|---|---|
| 6,720,879 B2 | 4/2004 | Edwards |
| 2008/0027599 A1 | 1/2008 | Logan |

(Continued)

FOREIGN PATENT DOCUMENTS

| | | |
|---|---|---|
| CN | 104751626 A | 7/2015 |
| CN | 104766443 A | 7/2015 |

(Continued)

OTHER PUBLICATIONS

DogTelligent Connected CollarTM.
Mobileeye 550 User Manuel https://www.manualslib.com/products/Mobileye-560-4025738.html.

*Primary Examiner* — Gertrude Arthur Jeanglaude
(74) *Attorney, Agent, or Firm* — David R. Stevens; Stevens Law Group

(57) ABSTRACT

Example systems and methods for detecting an animal proximate a vehicle are described. In one implementation, a wearable device carried by an animal is activated when the wearable device is within a predetermined distance of a vehicle. The vehicle receives a signal from the wearable device and determines an approximate distance between the wearable device and the vehicle. An alert is generated to warn a driver that an animal is near the vehicle. The alert has an intensity level that corresponds to the approximate distance between the wearable device and the vehicle.

5 Claims, 7 Drawing Sheets

(52) U.S. Cl.
CPC ......... *G06K 19/07762* (2013.01); *G08B 3/10* (2013.01); *G08B 5/38* (2013.01); *G08G 1/163* (2013.01); *G08G 1/166* (2013.01); *B60W 2050/143* (2013.01); *B60W 2550/40* (2013.01)

(58) Field of Classification Search
CPC ........ B60W 2050/143; B60W 2550/40; G06K 19/07762; G08B 5/38
USPC ......................................................... 701/301
See application file for complete search history.

(56) References Cited

U.S. PATENT DOCUMENTS

| | | |
|---|---|---|
| 2008/0097700 A1 | 4/2008 | Grimm |
| 2013/0015963 A1 | 1/2013 | Stegmaier |
| 2013/0127638 A1 | 5/2013 | Harrison |
| 2014/0230755 A1 | 8/2014 | Garmin |
| 2014/0277935 A1 | 9/2014 | Daman |
| 2014/0300473 A1 | 10/2014 | Vatn |
| 2016/0178392 A1* | 6/2016 | Goldfain ................ G16H 40/63 702/104 |
| 2017/0135315 A1* | 5/2017 | Marmen ............... A01K 15/021 |

FOREIGN PATENT DOCUMENTS

| | | |
|---|---|---|
| CN | 104777451 A | 7/2015 |
| DE | 102012206522 A1 | 10/2013 |
| EP | 2840556 | 2/2015 |
| WO | WO 03/005316 | 1/2003 |

* cited by examiner

DETECTING AN ANIMAL PROXIMATE A VEHICLE

RELATED APPLICATIONS

This application claims the benefit of PCT Application Serial No. PCT/US2015/057806, filed Oct. 28, 2015, which is hereby incorporated herein by reference in its entirety for all purposes.

TECHNICAL FIELD

The present disclosure relates to systems and methods that detect an animal located near a vehicle using a device worn by, or attached to, the animal.

BACKGROUND

Animals and vehicles are often located in the same areas which may result in a vehicle hitting an animal, such as a pet. Typically, the driver of a vehicle is not aware of animals in the proximity of the vehicle and may accidentally hit the animal, which may injure the animal and/or damage the vehicle. For example, if a dog (or other animal) runs out in front of a vehicle, the driver of the vehicle who is unaware of the dog in the proximity of the vehicle may not have enough time to stop or steer the vehicle to avoid hitting the dog. Additionally, animals may leave their home such that the owner of the animal must search for the missing animal. Accordingly, there is a need for a system and method that notifies vehicle drivers when animals are located near the vehicle and helps animal owners locate animals that have left the owner's home.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
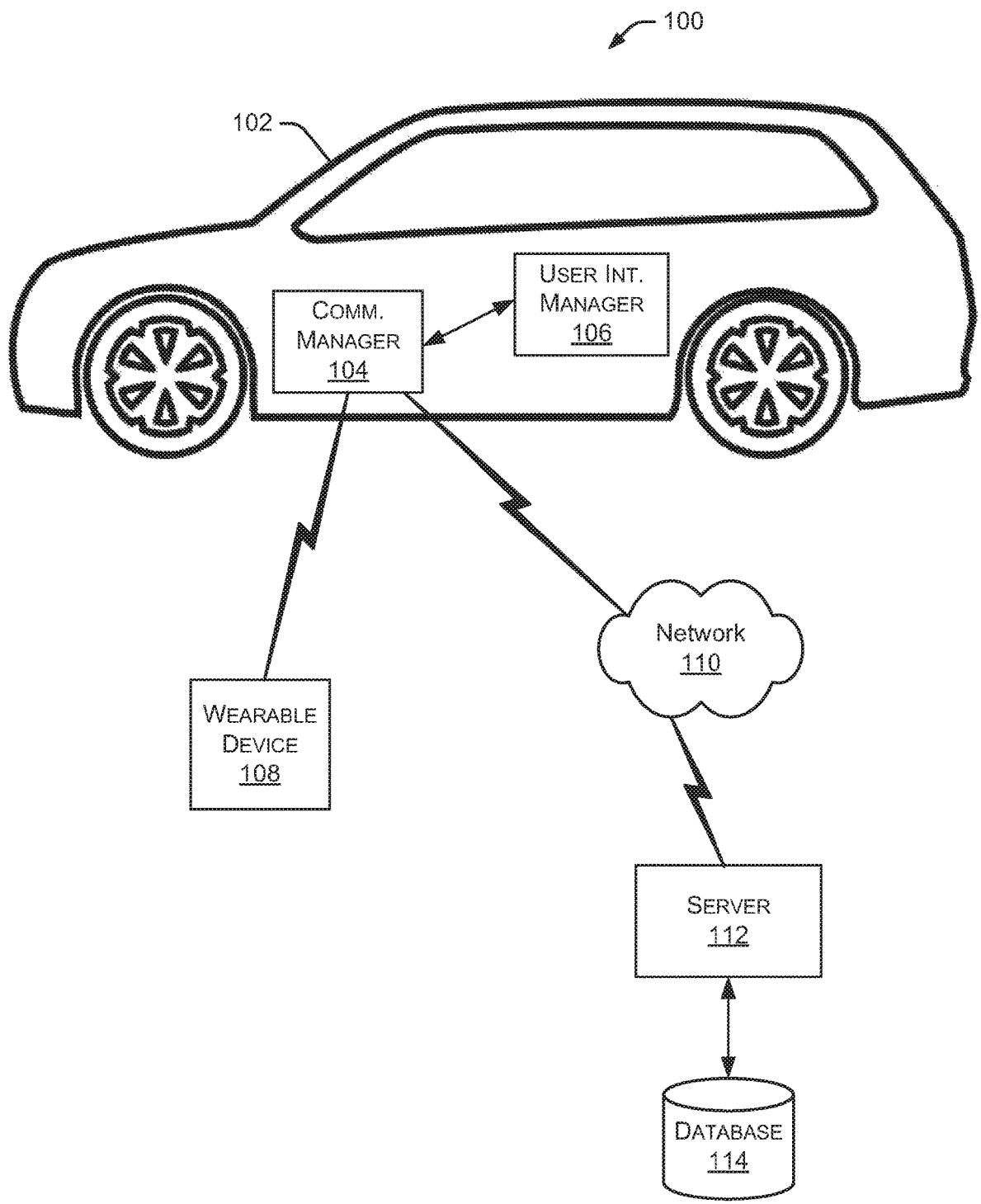
FIG. 1 is a block diagram depicting an example environment capable of implementing the systems and methods discussed herein.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein activate a device worn by (or carried by) an animal when the device is within a predetermined distance of a vehicle. The vehicle receives a signal from the device, such as a Bluetooth signal. A processor in the vehicle determines an approximate distance between the device and the vehicle. A symbol is flashed to the driver of the vehicle (e.g., on the dashboard or information display panel) at a frequency that corresponds to the approximate distance between the device and the vehicle. For example, the symbol is flashed at a faster frequency when the device is close to the vehicle.

Particular examples discussed herein refer to communicating the proximity of a dog or other pet to a driver of a vehicle. However, the described systems and methods are applicable to any type of animal or object. For example, a wearable device, as discussed herein, may be carried by an animal, a person or an object that may be found in the proximity of a vehicle. In some embodiments, a wearable device may be located on a bicycle or a child's outdoor play toy. In these embodiments, the wearable device can alert the driver of a vehicle that the object carrying the wearable device is located proximate the vehicle.

As used herein, a vehicle includes a car, truck, bus, van, motorcycle, scooter, bicycle, and the like. Particular examples discussed herein refer to use of a Bluetooth wireless communication system. However, the described systems and methods are applicable to any type of wireless communication system using any communication protocol or messaging system.

FIG. 1 is a block diagram depicting an example environment 100 capable of implementing the systems and methods discussed herein. A vehicle 102 includes a communication manager 104 that controls the communication of data between vehicle 102 and a wearable device 108. As discussed herein, wearable device 108 is any device capable of being worn by, attached to, or carried by an animal, a person or an object. In some embodiments, wearable device 108 is an animal collar or a tag (or other device) attached to an animal collar. Wearable device 108 is capable of wireless communication with communication manager 104 when wearable device 108 is within a communication range of communication manager 104. In some embodiments, wearable device 108 is a Bluetooth device and communication manager 104 supports Bluetooth communications. In particular implementations, wearable device 108 is a Bluetooth Low Energy (BLE) device.

Communication manager 104 is coupled to a user interface manager 106 that is capable of presenting information to a driver and/or passenger of vehicle 102. In some embodiments, user interface manager 106 controls the display of a flashing symbol that indicates an animal in proximity to vehicle 102. In other embodiments, user interface manager 106 controls the presentation of other visual or audio indications that notify the driver or passenger of vehicle 102 that an animal is in proximity to vehicle 102. This notification allows the driver to be more alert and watch for an animal while driving.

Communication manager 104 may periodically communicate with a data communication network 110, such as the Internet or other network. For example, communication manager 104 may communicate with a server 112 via network 110. Server 112 can access data from a database 114, which includes user profile information, Bluetooth address information associated with various wearable devices 108, and other data. This accessed data is communicated to communication manager 104 to assist in determining an owner of the animal carrying wearable device 108. Each wearable device 108 has a unique Bluetooth address which can be associated with a particular user. As discussed herein, communication manager 104 may send a message to an owner of an animal when the associated Bluetooth address is detected in the vicinity of vehicle 102. Additionally, communication manager 104 may determine a current geographic location of vehicle 102 using a GPS (global positioning system) contained in vehicle 102.

In the example embodiment 100 shown in FIG. 1, wearable device 108 is shown as communicating with one vehicle 102. In other embodiments, a particular wearable device 108 may communicate with multiple vehicles 102 if more than one vehicle 102 is in proximity to wearable device 108. In this situation, the drivers and passengers of the multiple vehicles are all notified of the animal in the vicinity of the vehicle. Additionally, as discussed herein, each of the multiple vehicles may communicate messages (e.g., text messages) to an owner of the animal carrying the wearable device, thereby notifying the owner of the approximate location of the animal.

Figure 2:
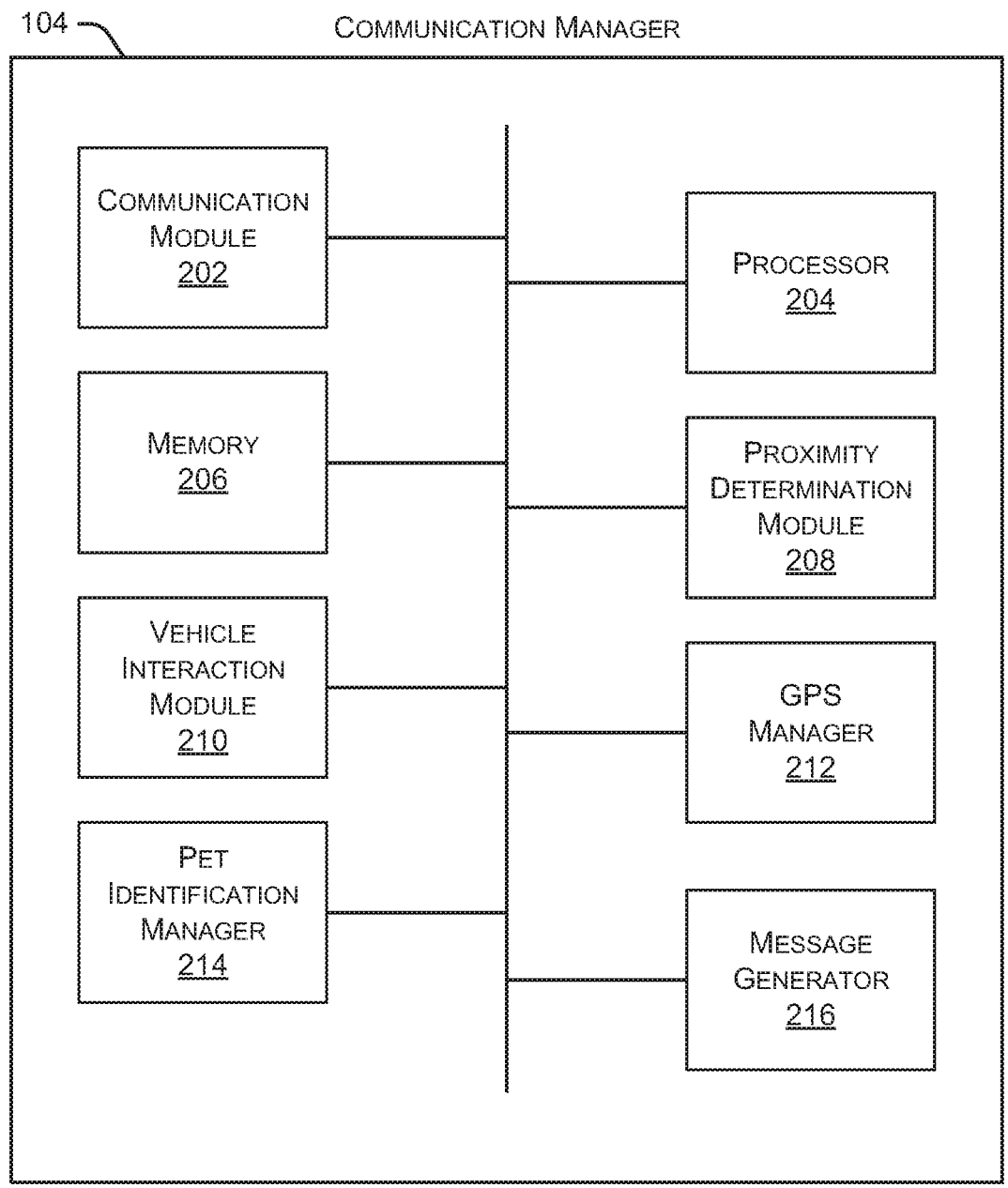
FIG. 2 is a block diagram depicting an embodiment of a communication manager.

FIG. 2 is a block diagram depicting an embodiment of communication manager 104. As shown in FIG. 2, communication manager 104 includes a communication module 202, a processor 204, and a memory 206. Communication module 202 allows communication manager 104 to communicate with other systems or components, such as user interface manager 106, wearable device 108, network 110, server 112, and the like. Additionally, communication module 202 may communicate with other systems or devices in vehicle 102 via a bus, such as a CAN (controller area network) bus. Processor 204 executes various instructions to implement the functionality provided by communication manager 104. Processor 204 may include any type of general purpose or special purpose processor for executing program code or instructions. Memory 206 stores these instructions as well as other data used by processor 204 and other modules contained in communication manager 104. Additionally, memory 206 may store user-specific information, such as user profile information, user communication parameters, and the like.

Communication manager 104 also includes a proximity determination module 208 that calculates an approximate distance between vehicle 102 and wearable device 108.

Various techniques are available for determining the approximate distance between two devices communicating with one another wirelessly. In some embodiments, the distance between vehicle 102 and wearable device 108 is determined using a radio frequency "time of flight" estimation. For example, one technique measures relationships between known locations and compares those with an unknown location/relationship, such as a pet, person or object. The technique then translates the relationship with the unknown object into a physical location on a map.

A vehicle interaction module 210 coordinates the exchange of information between communication manager 104 and other vehicle systems and components, such as user interface manager 106, GPS systems, infotainment systems, driver display systems, and the like. A GPS manager 212 is capable of decoding GPS signals to determine a current geographic location of vehicle 102. As discussed herein, the current geographic location of vehicle 102 may be communicated to an owner of an animal carrying wearable device 108. A pet identification manager 214 determines an owner associated with a particular animal carrying wearable device 108 and a message generator 216 generates various messages, such as messages to the owner of a particular animal. Message generator 216 is capable of generating various types of messages, such as text messages, email messages, and the like.

Figure 3:
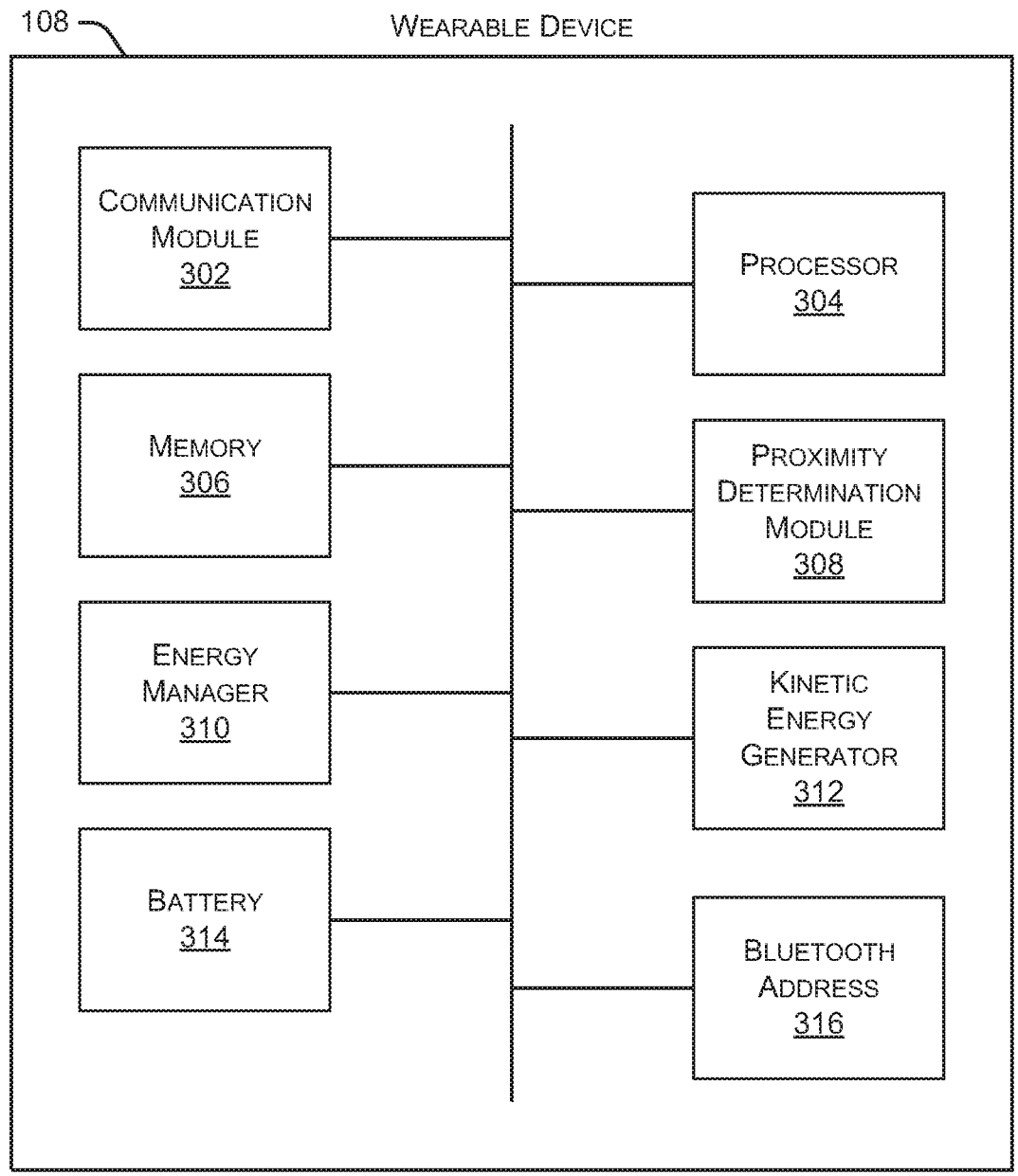
FIG. 3 is a block diagram depicting an embodiment of a wearable device capable of being worn or carried by an animal.

FIG. 3 is a block diagram depicting an embodiment of a wearable device 108 attached to or carried by an animal, person or object. As shown in FIG. 3, wearable device 108 includes a communication module 302, a processor 304, and a memory 306. Communication module 302 allows wearable device 108 to communicate with other systems or components, such as communication manager 104 in one or more different vehicles. Processor 304 executes various instructions to implement the functionality provided by wearable device 108. Processor 304 may include any type of general purpose or special purpose processor for executing program code or instructions. Memory 306 stores these instructions as well as other data used by processor 304 and other modules contained in wearable device 108. Additionally, memory 306 may store other information, such as communication parameters and the like.

Wearable device 108 also includes a proximity determination module 308 that determines when wearable device 108 is within a predetermined distance of vehicle 102. As mentioned above, various techniques are available for determining the approximate distance between two devices communicating with one another wirelessly. An example predetermined distance is approximately 25 feet, although the predetermined distance can be of any value as long as wearable device 108 and vehicle 102 are within communication range of one another. In one embodiment, vehicle 102 has a larger power source and, therefore, communicates initial identification messages to wearable device 108 to establish the initial communication between the two devices.

An energy manager 310 determines whether wearable device 108 is in an active mode or an energy-saving mode based on the proximity of wearable device 108 to one or more vehicles. Energy manager 310 changes wearable device 108 to an energy-saving mode when no vehicles are nearby to save energy stored in a battery 314. Since no vehicles are present, wearable device 108 does not need to communicate information regarding the presence of the wearable device. When a vehicle is detected, wearable device 108 is changed to an active mode to notify the vehicle of the animal in the area. A kinetic energy generator 312 converts kinetic energy from the animal (or other object carrying wearable device 108) into electrical energy. In alternate embodiments, any type of charging system or charging technique may be used to generate electricity and charge battery 314. Energy manager 310 may also determine whether to use the electrical energy produced by kinetic energy generator 312 to charge battery 314. Wearable device 108 also includes a Bluetooth address 316 that uniquely identifies the wearable device.

Figure 4:
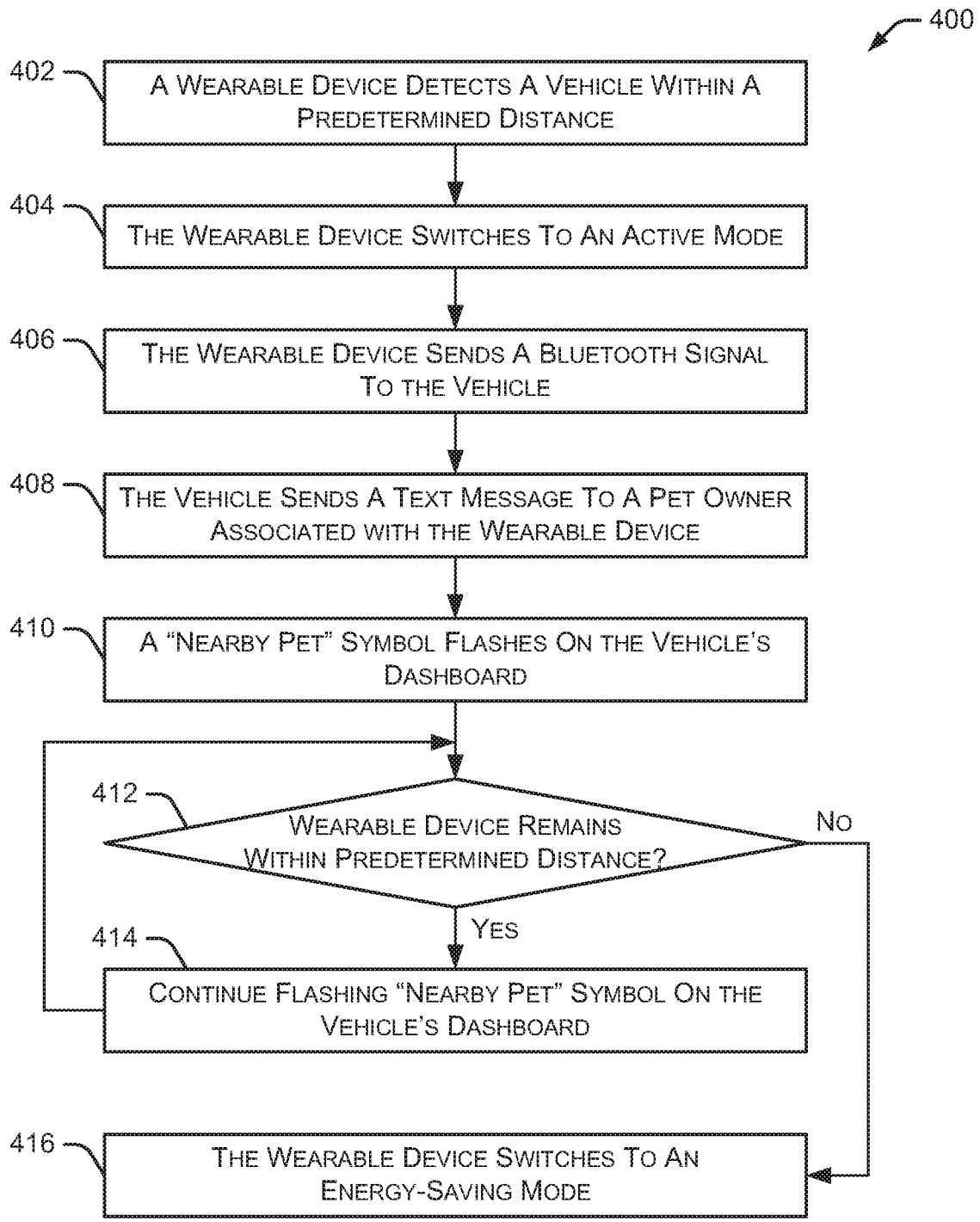
FIG. 4 is a flow diagram depicting an embodiment of a method for notifying a driver of an animal located near the vehicle.

FIG. 4 is a flow diagram depicting an embodiment of a method 400 for notifying a driver of an animal (e.g., a pet) located near the vehicle. Initially, a wearable device detects a vehicle within a predetermined distance at 402. In some embodiments the wearable device pairs with the vehicle when they come within broadcast range of each other. In particular implementations, signals between the wearable device and the vehicle can hop multiple devices over a mesh network to increase the effective broadcast range. In some embodiments, a wearable device detects multiple vehicles, all of which are within a predetermined distance of the wearable device. Upon detection of a vehicle within a predetermined distance, the wearable device switches to an active mode 404. Upon activation, the wearable device may send an activation signal to the vehicle indicating that the wearable device is now active. During operation in the active mode, the wearable device sends a Bluetooth signal to the vehicle at 406. The Bluetooth signal may include a variety of data, such as communication time for the signal to travel between the wearable device and the vehicle, information related to the pet (e.g., pet name, owner's name, and owner's contact information), and identifies the source of the signal as a wearable device being carried by an animal. The pet owner may restrict the types of information communicated between the wearable device and the vehicle.

In some embodiments, the vehicle sends a text message (or other type of message) to a pet owner associated with the wearable device at 408. For example, a processor in the vehicle can identify an owner associated with the wearable device based on the Bluetooth address associated with the wearable device. Using the Bluetooth address, the processor can access a database of owners and identify profile information for the owner of the specific wearable device. The profile information includes message addresses (e.g., text address or email address) that the processor in the vehicle can use to send a message to the owner of the pet. Additionally, the processor can determine an approximate vehicle location by triangulating with other Bluetooth signals/devices. For example, in the Internet of Things (IoT), any number of Bluetooth devices can communicate with one another. In this situation, the location of the vehicle (or the wearable device) may be defined relative to the pet's location instead of defining a fixed geographic location, such as provided by a GPS.

In other embodiments, the processor in the vehicle can determine an approximate vehicle location using a GPS system installed in the vehicle. The vehicle location information can be included in the message sent to the pet owner such that the pet owner can locate their pet. The pet owner may be a driver or passenger in the vehicle. Alternatively, the pet owner may be located at a location that is remote from the current location of the vehicle.

Method 400 also flashes at 410 a "nearby pet" symbol (or other graphic indicator) on the vehicle's dashboard, infotainment system or other display mechanism to alert the driver of an animal in the vicinity of the vehicle. This alert allows the driver to be more cautious and watch for the animal. In other embodiments, audio warnings and/or other visual warnings are provided to the driver of the vehicle.

If the wearable device remains within the predetermined distance at 412, the system continues flashing the "nearby pet" symbol on the vehicle's dashboard at 414. However, if the wearable device moves outside the predetermined distance at 412, then the wearable device switches to an energy-saving mode at 416 because no vehicles are in the area that need to be alerted to the existence of the animal carrying the wearable device.

Figure 5:
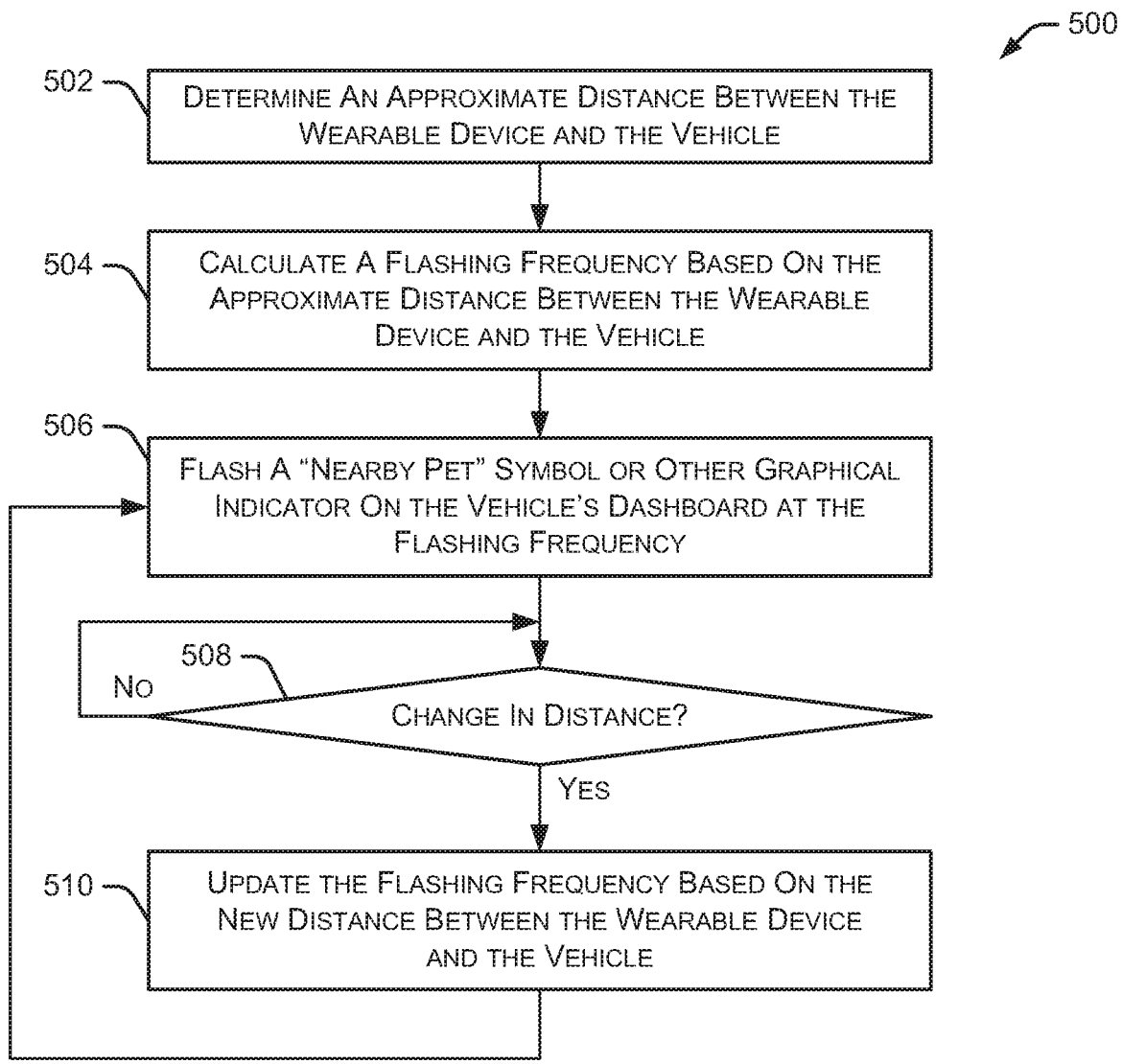
FIG. 5 is a flow diagram depicting an embodiment of a method for determining a frequency to flash a "nearby pet" symbol on a vehicle dashboard.

FIG. 5 is a flow diagram depicting an embodiment of a method 500 for determining a frequency to flash a "nearby pet" symbol on a vehicle dashboard. Initially, method 500 determines an approximate distance between the wearable device and the vehicle at 502. Based on the approximate distance between the wearable device and the vehicle, method 500 calculates a flashing frequency (for flashing the "nearby pet" symbol) at 504. In some embodiments, the frequency of the flashing symbol increases as the approximate distance between the wearable device and the vehicle decreases. In various embodiments, the frequency of the flashing symbol can be calculated using a smooth function or as a step function implemented, for example, using a lookup table. Additionally, the frequency calculation technique may consider the relative distance between the wearable device and the vehicle as well as the rate of closure between the wearable device and the vehicle.

In other embodiments, other types of alerts (e.g., audible alerts) are provided to the driver of a vehicle to indicate the presence of an animal near the vehicle. The alert provided to the driver may have varying levels of intensity based on the distance between the vehicle and the wearable device. For example, the intensity level may increase as the distance between the vehicle and the wearable device decreases. As used herein, the frequency of flashing a "nearby pet" symbol represents one example of an intensity level.

Method 500 continues as it flashes at 506 the "nearby pet" symbol or other graphical indicator on the vehicle's dashboard at the calculated flashing frequency. If the approximate distance between the wearable device and the vehicle has not changed at 508, the "nearby pet" symbol continues flashing at the same frequency. However, if the distance between the wearable device and the vehicle changes, the method updates the flashing frequency at 510 based on the new distance between the wearable device and the vehicle.

In alternate embodiments, the volume of an audible sound changes based on the approximate distance between the wearable device and the vehicle. For example, the volume of the audible sound increases as the approximate distance between the wearable device and the vehicle decreases.

Figure 6:
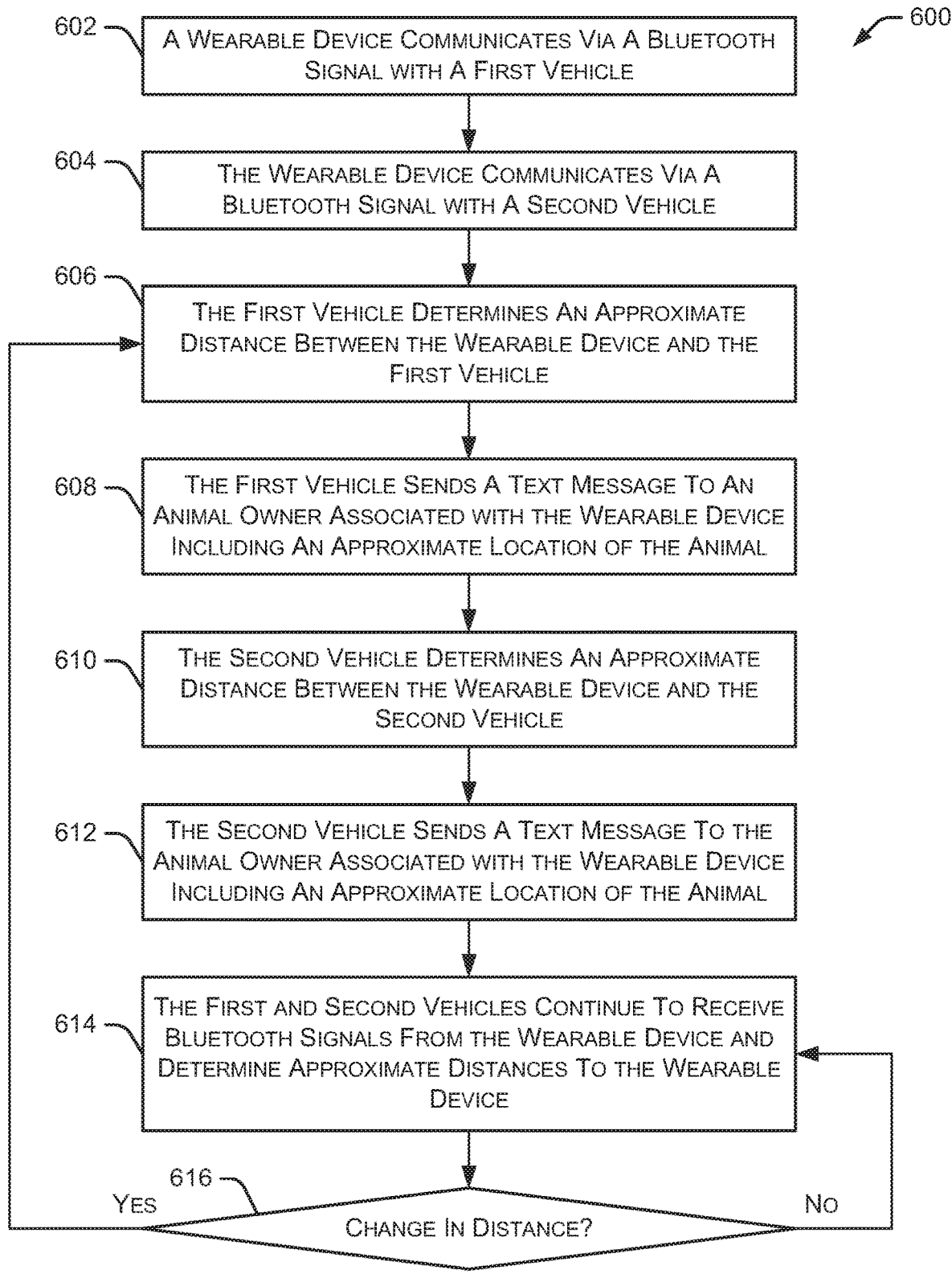
FIG. 6 is a flow diagram depicting an embodiment of a method for locating an animal having a wearable device.

FIG. 6 is a flow diagram depicting an embodiment of a method 600 for locating an animal having a wearable device. In the example of FIG. 6, the wearable device communicates with multiple vehicles, each of which can communicate approximate location information to the owner of the animal carrying the wearable device. Initially, a wearable device communicates via a Bluetooth signal with a first vehicle at 602. The same wearable device also communicates via a Bluetooth signal with a second vehicle at 604. The first vehicle determines an approximate distance between the wearable device and the first vehicle at 606. Method 600 continues as the first vehicle sends a text message (or other message) to an animal owner associated with the wearable device including an approximate location of the animal at 608. The approximate location of the animal can be determined using a GPS in the first vehicle or any other system capable of determining an approximate geographic location.

Method 600 continues as the second vehicle determines an approximate distance between the wearable device and the second vehicle at 610. The second vehicle sends a text message (or other message) to the animal owner associated with the wearable device including an approximate location of the animal at 612. The approximate location of the animal can be determined using a GPS in the second vehicle or any other system capable of determining an approximate geographic location. The first and second vehicles continue to receive Bluetooth signals from the wearable device and determine approximate distances to the wearable device at 614. If a change in distance is detected at 616, the method returns to 606 to determine the new distances.

The method of FIG. 6 is useful in helping the animal owner locate a lost or missing animal. By receiving text messages from multiple vehicles, the animal owner can more quickly locate the animal. Although two vehicles are discussed in this example, alternate embodiments may include any number of vehicles communicating with the wearable device. Additionally, if one of the vehicles moves away from the animal (out of range of the Bluetooth signal), the remaining vehicle(s) can continue to communicate with the wearable device and send text messages to the animal owner.

Figure 7:
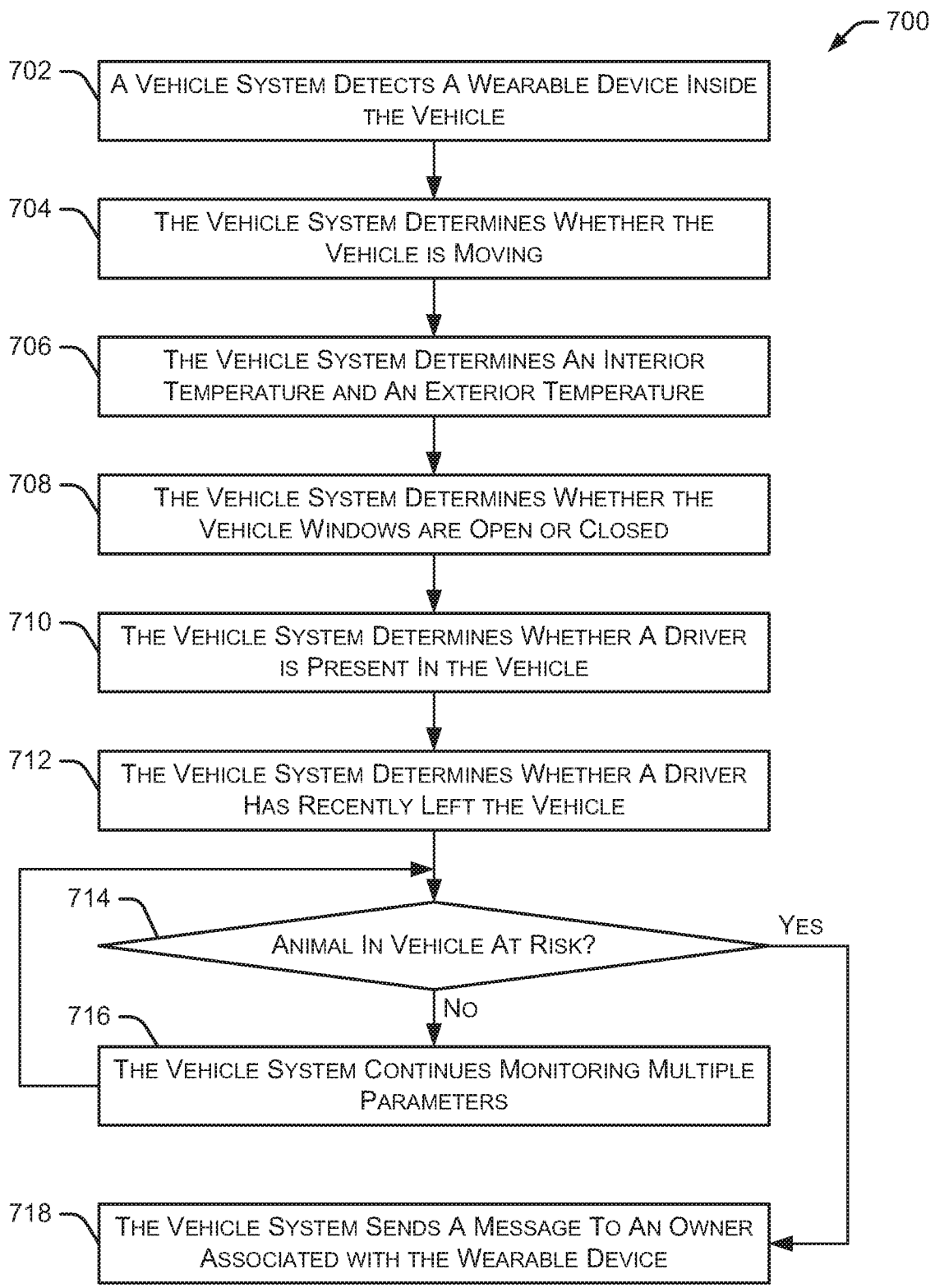
FIG. 7 is a flow diagram depicting an embodiment of a method for detecting an animal at risk in a vehicle.

FIG. 7 is a flow diagram depicting an embodiment of a method 700 for detecting an animal at risk in a vehicle. Initially, a vehicle system detects a wearable device inside the vehicle at 702. The vehicle system may be any type of vehicle control system, infotainment system, navigation system, and the like. In some embodiments, the vehicle system includes multiple components, devices, sub-systems, and the like. The vehicle system determines whether the vehicle is moving at 704. Additionally, the vehicle system determines an interior temperature (i.e., a temperature inside the vehicle) and an exterior temperature (i.e., a temperature outside the vehicle) at 706. The vehicle system further determines whether the vehicle windows are open or closed (or partially open) at 708 and determines whether a driver (or other person) is present in the vehicle at 710.

Method 700 continues as the vehicle system determines whether a driver has recently left the vehicle at 712. This determination may also include identifying any other people in the vehicle. The vehicle system may detect a driver leaving a vehicle based on the driver's door being opened and closed, the doors being locked, and a key fob associated with the driver moving away from the vehicle.

Based on the multiple determinations, method 700 determines whether an animal in the vehicle is at risk at 714. For example, if an animal is detected in the vehicle based on the presence of a wearable device, an interior temperature is at dangerously high levels, and no person is in the vehicle, the method may determine that an animal in the vehicle is at risk. If an animal is not at risk, the vehicle system continues monitoring at 716 the multiple parameters discussed in 702-712. If an animal is at risk, the vehicle system sends a message (e.g., a text message or other alert) to an owner associated with the wearable device at 718. The message may include details about the animal risk, such as the animal being alone in the vehicle at high temperatures. This can alert an owner who accidentally left their animal in the vehicle or who did not realize the increasing temperature in the vehicle. In some embodiments, the vehicle system may send a message to animal control or law enforcement personnel to warn them of the animal at risk, including the location of the animal and the name of the owner.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method for animal tracking comprising:
receiving, by a vehicle, a signal from a wearable device, wherein the signal includes an identification code associated with the wearable device, and wherein the signal indicates that the wearable device is carried by an animal;
determining, using one or more processors, an approximate location of the vehicle;
determining, using the one or more processors, a user associated with the identification code; and
communicating, using the one or more processors, a message to the user associated with the identification code, wherein the message includes the approximate location of the vehicle and notifies the user that the wearable device was detected near the approximate location of the vehicle.

2. The method of claim 1, wherein the received signal is a Bluetooth signal and the identification code is a Bluetooth address.

3. The method of claim 1, further comprising deactivating the wearable device when the wearable device is beyond the predetermined distance from the vehicle.

4. The method of claim 1, further comprising:
receiving, by a second vehicle, the signal from the wearable device;
determining, using the one or more processors, an approximate location of the second vehicle; and
communicating, using the one or more processors, a second message to the user associated with the identification code, wherein the second message includes the approximate location of the second vehicle and notifies the user that the wearable device was detected near the approximate location of the second vehicle.

5. The method of claim 1, further comprising deactivating the wearable device when the wearable device is beyond the predetermined distance from the vehicle.

* * * * *